(12) United States Patent
Buffy et al.

(10) Patent No.: US 8,461,231 B2
(45) Date of Patent: Jun. 11, 2013

(54) RAPID DRY FIBERGLASS STAIN

(75) Inventors: Jarrod J. Buffy, Waterville, OH (US); William V. Pagryzinski, Leo, IN (US)

(73) Assignee: Therma-Tru Corp., Maumee, OH (US)

( * ) Notice: Subject to any disclaimer, the term of this patent is extended or adjusted under 35 U.S.C. 154(b) by 346 days.

(21) Appl. No.: 12/505,702

(22) Filed: Jul. 20, 2009

(65) Prior Publication Data

US 2010/0022685 A1 Jan. 28, 2010

Related U.S. Application Data

(60) Provisional application No. 61/083,002, filed on Jul. 23, 2008.

(51) Int. Cl.
| | |
|---|---|
| C08G 59/50 | (2006.01) |
| C08L 63/00 | (2006.01) |
| C08L 91/00 | (2006.01) |
| C08L 9/00 | (2006.01) |
| C09D 11/02 | (2006.01) |
| B60C 1/00 | (2006.01) |
| C07C 409/00 | (2006.01) |

(52) U.S. Cl.
USPC .......... 523/400; 523/500; 524/313; 524/571; 568/608

(58) Field of Classification Search
USPC ............ 524/313, 571; 523/400, 500; 568/608
See application file for complete search history.

(56) References Cited

U.S. PATENT DOCUMENTS

| 2,264,373 A * | 12/1941 | Harvey | 106/252 |
| 2,443,044 A * | 6/1948 | Lycan et al. | 554/27 |
| 2,637,709 A * | 5/1953 | Harvey | 528/111.5 |
| 3,183,109 A * | 5/1965 | Zankl et al. | 106/252 |
| 4,386,180 A | 5/1983 | Lat et al. | |
| 4,420,571 A | 12/1983 | Blickensderfer et al. | |
| 4,919,721 A | 4/1990 | Hermann | |
| 5,288,805 A * | 2/1994 | Kodali | 525/190 |
| 5,948,849 A | 9/1999 | Porter | |
| 6,201,057 B1 | 3/2001 | Porter | |
| 6,344,516 B1 * | 2/2002 | Ikeda et al. | 524/717 |
| 6,358,614 B1 | 3/2002 | Porter | |
| 6,979,475 B2 | 12/2005 | Dresser | |
| 7,084,103 B1 * | 8/2006 | Springsted et al. | 510/475 |
| 7,326,765 B1 | 2/2008 | Tzap et al. | |
| 2005/0210792 A1 | 9/2005 | Dresser | |
| 2007/0110979 A1 | 5/2007 | Clark et al. | |
| 2008/0103283 A1 | 5/2008 | Tzap et al. | |

OTHER PUBLICATIONS

Chisholm, Hugh The Encyclopaedia Britannica vol. XVI p. 735 1911 NewYork 11th Ed.*
Science Lab MSDS (Copper Naphthenate 8% Cu MSDS Science Lab 2005) {http://www.sciencelab.com/msds.php?msdsId=9923553}.*
Wang et al. (Linchan Huaxue Gongye vol. 25 No. 1 pp. 45-48 2005 Abstract).*
Spectrum Chemical MSDS Cobalt Naphthenate Print Date Sep. 11, 2006 {https://www.spectrumchemical.com/MSDS/C0547.PDF}.*
Lubi et al. (Polymer Plastics Technology and Engineering vol. 46 pp. 393-400).*
Raw Linseed Oil Standard Specification ASTM D 234-82—1998 updated—taken as December.*
Varma et al Allegmeine Oel- und Fett-Zeitung 1936 vol. 33 pp. 249-254 Abstract taken as December.*
Tullo, A.H., "A Nutty Chemical", Chemical & Engineering News, vol. 86, No. 36, pp. 26-27, Sep. 8, 2008.
Web printout from http://www.palmerint.com/cn3.html, one page, Palmer International, Inc., Palmer Press Release, Aug. 3, 2007, Palmer Launches Cashewthane™ 1630-1.
Web printout from http://www.palmerint.com/paints_and_coatings.html, Palmer International, Inc., Paints and Coatings, Cashewthane™ Resins, printed May 21, 2008.
One page brochure, Palmer International, Inc., 2002, Cashewthane™, 1612-75MS.

* cited by examiner

*Primary Examiner* — Patrick Ryan
*Assistant Examiner* — Aaron J. Greso
(74) *Attorney, Agent, or Firm* — Calfee, Halter & Griswold LLP

(57) ABSTRACT

A portion of the linseed oil ingredient used in fiberglass composite stains is replaced with a modified Cashew Nut Shell Liquid (CNSL) resin. As a result, the drying time of the stain is shortened considerably yet is still long enough to allow working of the stain into the composite for developing a simulated wood appearance.

5 Claims, No Drawings

RAPID DRY FIBERGLASS STAIN

This application claims the benefit of U.S. Provisional patent application Ser. No. 61/083,002 filed on Jul. 23, 2008, for RAPID DRY FIBERGLASS STAIN, the entire disclosure of which is fully incorporated herein by reference.

BACKGROUND

In order to make fiberglass products such as fiberglass doors look like they are made from wood, the fiberglass composite (i.e., the fiberglass/polymer binder mass) is colored with a suitable stain. Such stains are typically composed of various colorants and an organic solvent such as mineral spirits. Drying oils, which are liquid fatty acids capable of hardening to tough, solid films when exposed to air, are also normally included. A siccative, which is a metal salt of a short chain organic acid (e.g., cobalt di-(2-ethyl hexanoate)) is also normally included to cause the drying oil to cure, thereby forming a resinous binder for the colorant. Additional conventional ingredients may also be included.

The most commonly used drying oil used for this purpose is linseed oil, which typically contains ~58% α-linolenic acid, ~14% linoleic acid, ~19% oleic acid, ~4% steric acid and ~5% palmitic acid. In some cases, the linseed oil is prepolymerized ("modified") into a liquid resinous products before being used. For example, the linseed oil can be heated at elevated temperature, thereby producing "heat-bodied" linseed oil. Alternatively, the linseed oil can be co-polymerized with another monomer such as dicyclopentadiene. See, for example, U.S. Pat. No. 5,288,805 and U.S. Pat. No. 6,358,614, the disclosures of which are incorporated herein by reference.

Stains made with drying oils based on linseed oil, whether modified or unmodified, can take two to three days to cure when applied to fiberglass composites, since such composites do not absorb stains like natural wood. This represents a significant problem in practice because of the delay involved before the stain can be overcoated with another coat of stain and/or a protective clear coat such as polyurethane or the like.

Recently, Palmer International of Shippack, Pa., introduced a line of proprietary modified (prepolymerized) drying oil resins based on Cashew Nut Shell Liquid (CNSL). Although these liquid resinous products are said to provide low-VOC, air-drying wood stains capable of drying in as little as 4 to 5 hours, they dry too quickly to allow sufficient time for working these stains into fiberglass composite substrates, which is necessary when high quality, wood-simulating fiberglass doors are being made. Moreover, the adhesion of stains made with these products to fiberglass composite substrates is inadequate to be commercially viable.

SUMMARY

In accordance with this invention it has been found that the drying time of a fiberglass stain can be shortened to just 4 or 5 hours without substantially compromising the working time needed for working the stain into a fiberglass composite substrate, or the adhesion of the applied stain coating to this substrate, by replacing a portion of the linseed oil ingredient normally used in such fiberglass stains with such a modified CNSL resin.

Accordingly, this invention provides a new stain for fiberglass composite substrates comprising a colorant and a resin-forming component, the resin-forming component comprising a linseed oil ingredient and a modified CNSL resin.

DETAILED DESCRIPTION

Fiberglass Composite

This invention is directed to making stains for fiberglass composites (or simply "fiberglass"), i.e., shaped articles formed from glass fibers embedded in a thermoplastic or thermosetting resin, especially high quality exterior door systems made from such composites.

High quality fiberglass exterior doors are typically made by compression molding, thereby producing simulated wooden doors bearing molded surface skins exhibiting a wood grain surface texture. A suitable stain is then applied and worked into the surface by hand, typically for several minutes to an hour or more, thereby producing a finished surface having the look and feel of natural wood. Under production conditions where skilled workers, sophisticated spray equipment, drying ovens and the like are available, finishes almost indistinguishable from natural wood can be obtained.

Once dry, the stained surface skins are typically covered with one or more protective coatings or "topcoats." These can be formed from a variety of different polymer resins supplied in any convenient form such as organic solutions, aqueous dispersions and molten. See, for example, the above-noted U.S. Pat. No. 6,358,614, as well as U.S. Pat. No. 6,210,057 and U.S. Pat. No. 6,979,475, the disclosures of which are also incorporated herein by reference.

The inventive fiberglass stains are compatible with all such fiberglass composites and topcoats. That is to say, the inventive fiberglass stains are generally useful for staining fiberglass composites made from all materials which are now known, or which become known, as useful for making fiberglass composites. Similarly, all of the protective coatings which are now known, or which become known, for overcoating fiberglass stains can be used to top coat the fiberglass stains of this invention.

Colorant

The inventive stains, like other conventional fiberglass stains, include suitable colorants to develop the necessary colored appearance. Although dyes can be used, pigments (tint pastes) are the colorants of choice. Examples include rhodamine red (pigment red 81), carbazole violet (pigment violet 23), metallized azo reds (such as calcium lithol, lithol rubine), diarylide yellows (Yellow 14), monoarylide yellow (Yellow 74), naphthol reds (e.g., Red 22, 122, 2), phthalocyanine blue (blue 15:3 et al.), phthalocyanine green (Green 7), quinacridone red (Red 122), oranges (Orange 5 and 16), methyl violet (Violet 3), and carbon black (both acidic and neutral grades). Further examples include AL 509 Burnt Umber tint paste AL 505 Burnt Sienna tint paste AL 611 Red Oxide tint paste and AL 329 Black tint paste, just to name a few. Generally speaking any colorant which is now known, or which becomes known, as useful in making fiberglass stains can be used as the colorant in the fiberglass stains of this invention.

Because the inventive stains are formulated, in part, with a modified CNSL, less solvent and hence more colorant can be used relative to conventional fiberglass stains. Therefore, colorant loadings in the inventive stains will typically be on the order of about 25 to 65 wt. %, more commonly about 35 to 55 wt. %, and even about 42 to 48 wt. %.

Solvent

The inventive stains, like other conventional fiberglass stains, also include suitable solvents which basically act as liquid carriers. Examples include mineral spirits, naphthas, xylenes, toluenes, trimethyl benzenes, ethyl toluenes and ethyl benzenes and mixtures thereof. Mineral spirits are normally be used.

As indicated above, less solvent is used in the inventive fiberglass stains relative to conventional stains, because a significant part of its resin-forming component is composed of a modified CNSL. Thus, the amount of solvents in the inventive stains (including any solvent that may be present in the resin-forming component, as supplied from the manufacturer) is typically on the order of about 4 to 30 wt. %, more typically 5 to 20 wt. %, and even about 6 to 15 wt. %, based on the weight of the stain as a whole. Because of this relatively low concentration of organic solvents, the inventive fiberglass stains typically exhibit a solids content of ~70 wt. %, ~80 wt. % or even ~85 wt. % or more and VOC contents of ~300 g/l or less, ~250 g/l or less, and even ~200 g/l or less.

In some embodiments of the invention, approximately 10 to 30 wt. %, more typically about 15 to 25 wt. %, based on combined weight of all the solvents, are slowly evaporating solvents commonly known as "tail solvents." The remainder of the solvents in these embodiments exhibit fast to moderate evaporation, such as mineral spirits, naphtha, solvent 142 petroleum distillate, and the like. It is preferred to use combinations of these faster evaporating solvents such that the solvents flash off at different intervals. In these embodiments, the majority of solvent, i.e., >50%, should flash off within a period of from 2 to 10 minutes. Most preferably, solvent 142 petroleum distillate, mineral spirits, and tridecyl alcohol tail solvent are employed.

Other Additives

The inventive stains may also contain other known additives in conventional amounts. For example, the inventive stains can include leveling agents, drying agents, e.g., metal naphthenates such as cobalt naphthenate, calcium naphthenate and magnesium naphthenate, ultraviolet absorbers preferably of the non-sacrificial type, e.g., hindered amine stabilizers such as TINUVIN™ 292 and TINUVIN™ 328, wax, thickeners such as various clay minerals, anti-skin agents, and the like.

Resin-Forming Component

In accordance with this invention, the resin-forming component of the inventive stain, i.e., the polymers and/or polymer precursors which form a solid, hardened resinous mass once the stain dries and cures, is formed from a combination of a linseed oil ingredient and a modified CNSL resin. As a result, the inventive stain dries slowly enough to allow the necessary working to be done for developing the desired simulated wood grain appearance (e.g., 1-3 hours) yet fast enough to be overcoated within 6 hours or so.

The linseed oil ingredient is preferably formed from unmodified linseed oil. Alternatively, it can be formed, wholly or partially, from modified linseed oil which has been modified by known techniques for improving its performance as an air drying oil in coating formulations. For example, unmodified linseed oil can be heated at elevated temperatures for a suitable time to develop a "heat-bodied" linseed oil. Alternatively or additionally, unmodified linseed oil can be co-polymerized with another monomer such as dicyclopentadiene as shown, for example, in the above-noted U.S. Pat. No. 5,288,805 and U.S. Pat. No. 6,358,614, the disclosures of which are incorporated herein by reference, which are believed to describe the DILULIN™ line of linseed oil/dicyclopentadiene copolymers available from Cargill, Inc. of Minneapolis, Minn.

In accordance with this invention, the resin-forming component of the inventive stain is formed in significant part from a modified CNSL resin. For this purpose, the modified CNSL can be an ethoxylated phenol of the type described in U.S. Pat. No. 7,084,103, which recently issued to Palmer International, Inc. of Shippack, Pa., the disclosure of which is incorporated herein by reference. As described in that patent, Cashew Nut Shell Liquid (CNSL) is composed predominantly of anacardic acid, which, when treated in the presence of heat, is decarboxylated giving rise to a meta-substituted phenol, 3-pentadecenyl phenol compound (trivial name: cardanol). The related phenol, 5-pentadecadienyl resorcinol, may also be present in CNSL (trivial name: cardol). When this material is contacted with ethylene oxide, normally in the presence of a suitable catalyst such as a Lewis acid or alkaline metal hydroxide, a highly ethoxylated product is obtained. When dissolved in a suitable solvent, this product provides a low-color, high solids/low-VOC, low viscosity fast drying air dry resin system capable of producing film coatings with excellent hardness.

Products made under this patent are believed to be the Cashewthane™ line of resins marketed by Palmer International, with Cashewthane AC5680, Cashewthane 1630-01 and Cashewthane 1612-75MS being especially interesting. In general, these products can be described as low color, highly unsaturated CNSL modified phenolic resins in mineral spirits having high solids contents (e.g., 55-85%, 70-80%, or even ~75%) and VOC contents of ~300 g/l or less.

Another type of modified CNSL resin that can be used to make the resin-forming component of the inventive stain are the melamine modified cashew nut oils described in U.S. Pat. No. 7,084,103, which also recently issued to Palmer International, Inc., the disclosure of which is also incorporated herein by reference. As described there, melamine ring-containing copolymers made by reacting a melamine base resin with Cashew Nut Shell Liquid (CNSL) are also capable of producing film coatings with excellent hardness from high solids/low-VOC coating compositions.

Essentially any amount of modified CNSL resin can be included in the resin-forming component of the inventive stain. For example, concentrations as low as 25, 20, 15, 10 or even 5 wt. % and as high as 95 or even 97 or even 98 wt. %, based on the total weight of resin-forming ingredients (i.e., including all resins and resin precursors but excluding siccatives and any solvent that may be included in these ingredients as supplied from the manufacturer). Normally, however, the concentration of this ingredient will be about 50 to 90 wt. %, 60 to 85 wt. % or even 65 to 80 wt. %, based on the weight of the entire resin-forming component.

Similarly, the amount of linseed oil ingredient that can be included in the resin-forming component of the inventive stain can be as little as 5, 3 or even 2 wt. % or as much as 75, 80, 85, 90 or even 95 wt. %, based on the weight of the entire resin-forming component. Normally, however, the amount of this ingredient will be about 10 to 50 wt. %, 15 to 40 wt. % or even 20 to 35 wt. %.

In general, the relative amounts of the modified CNSL resin and linseed oil ingredient included in particular fiberglass stains made in accordance with this invention should be selected to achieve the desired combination of drying and working times. So, for example, the particular fiberglass stain described in the following working example, which contained ~27 wt. % linseed oil ingredient and ~73 wt. % modified CNSL resin based on the combined weights of resin-forming ingredients in the stain, dried in about 6 hours. By increasing the amount modified CNSL resin and decreasing the amount of linseed oil ingredient, the drying time can be shortened and conversely. Thus, a person of ordinary skill in the art can easily formulate fiberglass stains having the particular drying times desired by suitably adjusting the proportions of these two ingredients in the stains. Thus, fiberglass stains having drying times anywhere between 3 hours to 2 days can easily be produced in accordance with this invention. Thus, fiberglass stains having drying times on the order of about 3, 4, 5, 6, 7, 8, 9, 10, 12, 15, 20, 24 hours and even longer are contemplated. Similarly, producing fiberglass stains having drying times between 3-24 hours, 4-12 hours, and even 5-9 hours is also contemplated.

In addition to the linseed oil ingredient and a modified CNSL resin discussed above, the resin-forming component of the inventive stains can also include other polymers which are known, or which become known, as additional resin forming ingredients or "secondary resins" in fiberglass stains and other coatings. Examples include the oil modified urethanes and medium or long oil alkyd polymers described in the above-noted U.S. Pat. No. 5,288,805. If so, such secondary resins can be used in amounts as low as 5, 4, 3, 2 or even 1 wt. % and as high as 30, 40 or even 50 wt. %, based on the weight of the entire resin-forming component. In some embodiments, the inventive fiberglass stain is free or essentially free of such secondary resins.

As indicated above, less solvent is used in the inventive fiberglass stains relative to conventional stains, because a significant part of its resin-forming component is composed of a modified CNSL resin. That being the case, the total amount of resin forming component in the inventive fiberglass stain (i.e., including all resins and resin precursors but excluding siccatives and any solvent that may be included in these ingredients as supplied from the manufacturer) will normally be about 20 to 60 wt. %, 30 to 50 wt. %, or even 35 to 45 wt. %.

Method of Manufacture and Use

The inventive fiberglass stains can be manufactured and used in a conventional manner. So, for example, the inventive stains can be made by first forming a "stain base" by mixing the resin-formers (linseed oil ingredient, modified CNSL and secondary resin, if any) by mechanical stirring followed by adding, with stirring, the solvent, siccatives and other additives. The mixture can then be further stirred until a homogenous mixture is obtained, which normally takes about 20 minutes to 2 hours. To the stain base so made is then added the particular colorants to be used followed by additional stirring until a uniform and constant color is obtained.

The inventive stain can then be used in a conventional manner by applying the stain to a fiberglass substrate with any convenient applicator such as a rag, bristle brush, foam brush, spray applications or any other application technique which is or becomes known for applying fiberglass stains to fiberglass substrates. Then, depending on the nature of the substrate being stained and the surface effect desired, the stain can simply be allowed to dry undisturbed, or the stain can be worked into the substrate's surface to develop the visual effect sought.

WORKING EXAMPLE

In order to more thoroughly describe this invention, the following working example is provided. In this working example, a fiberglass stain made in accordance with this invention contained the ingredients set forth in the following Table 1:

TABLE 1

| INGREDIENTS | FUNCTION | TOTAL GRAMS | Wt % |
|---|---|---|---|
| Cashewthane AC5680 (75 wt. % resin, 25 wt. % mineral spirits) | Resin-Former | 384.51 | 38.55% |
| Raw Linseed Oil | Resin-Former | 103.23 | 10.35% |
| CabOSil M-5 | Thickener | 6.68 | 0.67% |
| ASP-200 | Thickener | 41.75 | 4.19% |

TABLE 1-continued

| INGREDIENTS | FUNCTION | TOTAL GRAMS | Wt % |
|---|---|---|---|
| AL 509 BURNT UMBER Tint Paste | Tint Paste | 95.5 | 9.57% |
| AL 505 BURNT SIENNA Tint Paste | Tint Paste | 162.01 | 16.24% |
| AL 611A RED OXIDE Tint Paste | Tint Paste | 166.18 | 16.66% |
| AL 329 BLACK Tint Paste | Tint Paste | 21.98 | 2.20% |
| 10% Ca CHEM ALL (OMG#21) | Siccative | 2.88 | 0.29% |
| 12% Co CEM-ALL (OMG#109) | Siccative | 0.72 | 0.07% |
| 12% Mn CEEM-ALL (OMG#466) | Siccative | 0.71 | 0.07% |
| NUXTRA Zr 24% | Siccative | 1.2 | 0.12% |
| SKINO #2 (OMG#863) | Anti-Skin Agent | 1.9 | 0.19% |
| MINERAL SPIRITS | Solvent | 8.26 | 0.83% |
| | | 997.51 | 100.00 |

This stain was prepared by mixing the two resin-formers (raw linseed oil Cashewthane AC 5680) by mechanical stirring followed by adding, with stirring, the mineral spirits, thickeners and then the siccatives and anti-skin agent. The mixture was stirred until a homogenous mixture was obtained, about 20 minutes to 2 hours, thereby producing a stain "base." To this stain base, the various tint pastes were then added and stirring continued until the color of the composition was completely uniform and constant.

The stain so-obtained was then applied by means of a rag to the upper molded surface skin of a compression molded fiberglass exterior door, the molded skin surface having a simulated wood grain surface texture. The applied stain was then worked into this surface by moving the stain in a circular or cross-grain motion to cause the stain to penetrate the grainy textured surface and then smoothed in the direction of the grain. Staining and working were done in discrete sections of the doors surface, with the entire job taking about 40 minutes. Six hours after staining and working were completed, it was determined that the dried stain coating was ready to receive a conventional topcoat by the adhesion tape test of ASTM-D3359.

Although only a few embodiments of the invention have been described above, it should be appreciated that many modifications can be made without departing from the spirit and scope of the invention. All such modifications are intended to be included within the scope of this invention, which is to be limited only by the following claims:

The invention claimed is:

1. A stain for fiberglass composites comprising a colorant and a resin-forming component, the resin-forming component comprising a linseed oil ingredient and an ethoxylated phenol; wherein:
    the linseed oil ingredient is unmodified linseed oil,
    the ethoxylated phenol is the reaction product of ethylene oxide and decarboxylated cashew nut shell liquid (CNSL),
    the stain has a solids content of about 70 wt. % or more and a VOC content of about 300 g/l or less,
    the stain contains about 50 to 90 wt. % of ethoxylated phenol and about 10 to 50 wt. linseed oil ingredient, based on the weight of the resin-forming component.

2. The stain of claim 1, wherein the stain contains 20 to 40 wt. % of a secondary resin, based on the weight of the resin-forming component, the secondary resin comprising an oil modified urethane, a medium oil alkyd polymer, a long oil alkyd polymer, or mixtures thereof.

3. The stain of claim 1, wherein the ethoxylated phenol is an ethoxylated cardanol, an ethoxylated cardol, or a mixture thereof.

4. The stain of claim 1, wherein the ethoxylated phenol comprises one or more phenols having a structure represented by formula (I):

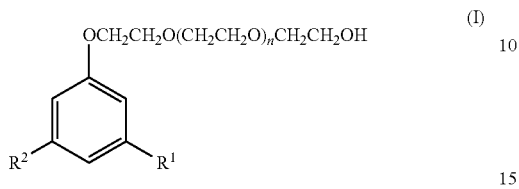

wherein n is an integer of 20 to 200, $R^1$ is an unsaturated hydrocarbon chain, and $R^2$ is selected from the group consisting of a hydrogen atom and —$OCH_2CH_2O(CH_2CH_2O)_nCH_2CH_2OH$.

5. The stain of claim 1 wherein the resin-forming component forms a solid, hardened resinous mass after application to a fiberglass composite and the applied resin-forming component dries and cures.

* * * * *